(12) United States Patent
Behl et al.

(10) Patent No.: US 7,206,201 B2
(45) Date of Patent: Apr. 17, 2007

(54) MEMORY STORAGE DEVICE DOCKING ADAPTER HAVING A LATERALLY MOUNTED FAN

(75) Inventors: Sunny Behl, San Jose, CA (US); Chris Erwin, Fremont, CA (US)

(73) Assignee: Steinbeck Cannery LLC, Los Altos, CA (US)

( * ) Notice: Subject to any disclaimer, the term of this patent is extended or adjusted under 35 U.S.C. 154(b) by 0 days.

(21) Appl. No.: 11/270,378

(22) Filed: Nov. 8, 2005

(65) Prior Publication Data

US 2006/0056150 A1    Mar. 16, 2006

Related U.S. Application Data

(63) Continuation of application No. 10/284,025, filed on Oct. 28, 2002, now Pat. No. 6,982,872, which is a continuation of application No. 09/298,139, filed on Apr. 23, 1999, now Pat. No. 6,473,297.

(51) Int. Cl.
 *G06F 1/20* (2006.01)
(52) U.S. Cl. ...................................... 361/687; 340/507
(58) Field of Classification Search ................ 361/687, 361/685, 752, 724–727; 312/223.1, 223.2; 340/507
See application file for complete search history.

(56) References Cited

U.S. PATENT DOCUMENTS

| | | | |
|---|---|---|---|
| 4,739,445 | A | 4/1988 | Tragen |
| 4,918,572 | A | 4/1990 | Tarver et al. |
| 5,171,183 | A | 12/1992 | Pollard et al. |
| RE34,369 | E | 9/1993 | Darden et al. |
| 5,260,851 | A | 11/1993 | Chiou |
| 5,587,881 | A | 12/1996 | Wang |
| 5,604,662 | A | 2/1997 | Anderson et al. |
| 5,694,290 | A | 12/1997 | Chang |
| 5,713,790 | A | 2/1998 | Lin |
| 5,751,549 | A * | 5/1998 | Eberhardt et al. .......... 361/687 |
| 5,765,933 | A | 6/1998 | Paul et al. |
| 5,831,525 | A | 11/1998 | Harvey |
| 5,912,799 | A | 6/1999 | Grouell et al. |
| 5,927,386 | A | 7/1999 | Lin |

(Continued)

FOREIGN PATENT DOCUMENTS

DE    19701548 A1    8/1997

(Continued)

*Primary Examiner*—Lisa Lea-Edmonds
(74) *Attorney, Agent, or Firm*—Townsend and Townsend and Crew LLP

(57) ABSTRACT

A docking adapter capable of cooling a memory storage device such as a hard disk drive includes a carrier and a rack. The carrier has a face with a vent, a backplane, a first lateral side and second lateral side extending perpendicularly from the face to the backplane. At least one lateral side of the carrier has a periphery defining an opening. The rack has a first lateral rail and a second lateral rail configured for receiving the carrier. The carrier includes a fan mounted on the lateral rail of the rack to blow air through the opening of the carrier. In an alternate embodiment of the invention, the fan is mounted on the carrier and the rack has a lateral opening. In each case, air is vented directly from the carrier to cool the hard disk drive.

20 Claims, 5 Drawing Sheets

U.S. PATENT DOCUMENTS

| | | |
|---|---|---|
| 5,956,227 A | 9/1999 | Kitaoka |
| 5,963,424 A | 10/1999 | Hileman et al. |
| 6,011,687 A | 1/2000 | Glukoter et al. |
| 6,069,792 A | 5/2000 | Nelik |
| 6,137,679 A * | 10/2000 | Chang ........................ 361/685 |
| 6,185,097 B1 | 2/2001 | Behl |
| 6,193,339 B1 | 2/2001 | Behl et al. |
| 6,574,100 B1 | 6/2003 | Anderson |
| 6,840,801 B1 * | 1/2005 | Behl ....................... 439/541.5 |

FOREIGN PATENT DOCUMENTS

| | | |
|---|---|---|
| DE | 10009334 A1 | 10/2000 |
| DE | 10007458 A1 | 11/2000 |

* cited by examiner

MEMORY STORAGE DEVICE DOCKING ADAPTER HAVING A LATERALLY MOUNTED FAN

CROSS-REFERENCES TO RELATED APPLICATIONS

This is a continuation application of U.S. patent application Ser. No. 10/284,025, filed Oct. 28, 2002, now U.S. Pat. No. 6,982,872 of which is a continuation of U.S. patent application Ser. No. 09/298,139, filed Apr. 23, 1999 now U.S. Pat. No. 6,473,297, which are hereby incorporated by reference in their entirety for all purposes.

FIELD OF THE INVENTION

The present invention pertains to docking adapters that removeably dock and cool memory storage devices.

BACKGROUND OF THE INVENTION

Docking adapters removeably interconnect memory storage devices to computer systems and to memory storage device systems, for example. Docking adapters can provide many advantages over fixed hardware including improved data security, optimization of data backup procedures and sharing of vast amounts of data between nonintegrated networks and systems. Docking adapters can also enable multiple users, each with a dockable hard drive, to use a single a machine without interfering with operating settings and data of another.

U.S. Pat. No. 34,369 to Darden et al., the disclosure of which is incorporated herein by reference, discloses a docking adapter for a hard disk drive. The docking adapter includes a carrier for holding a hard drive and a rack that mounts in a computer housing. The carrier has an open top. One drawback of the open top design is that when the carrier is removed from the rack, the hard disk drive is exposed. Exposing the hard disk drive may lead to damage to the hard drive, connective cabling, or other components during handling and transport.

Docking adapters that enclose hard disk drives are prone to heat buildup. When a hard drive operates and generates heat in a docking adapter, the docking adapter may inhibit airflow, which would otherwise cool the hard drive.

FIG. 1 shows a known docking adapter 10. The docking adapter 10 has a rack 12 and a carrier 14. The carrier 14 has a top cover 16 with vents that help cool a hard disk drive. Unfortunately, vents are not always effective at cooling an enclosed hard disk drive. When the docking adapter mounts in a crowded computer housing, for example, there may be insufficient space above the docking adapter to facilitate enough airflow through the vents to effectively cool a hard drive.

The rack 12 includes a backplane 18 having a connector and a rear-mounted fan. The carrier 14 has a backplane 20 with a connector that couples to the backplane connector of the rack. When the carrier inserts into the rack and the backplane 18 and 20 meet, there is little room for air to flow out from the carrier. The backplane of the carrier interferes with the outflow of air from the carrier. Accordingly, what is desired is a better way of providing airflow through a docking adapter.

BRIEF SUMMARY OF THE INVENTION

A docking adapter includes a rack which can be fixed in a memory storage device housing, microcomputer or other device and a carrier that houses a memory storage device such as a hard disk drive. The carrier has a face with an air intake vent, a backplane and lateral sides extending perpendicularly between the face and the backplane. The backplane has a data connector that couples to the hard disk drive.

The docking adapter, preferably the rack, includes laterally mounted fans to direct air from the carrier. Directing air laterally from the carrier prevents the carrier backplane, cabling, and other components from interfering with hard drive cooling.

The rack functions as a conduit so that air can be efficiently directed from the carrier. Accordingly, air is efficiently drawn from the carrier, away from the hard disk drive and expelled from the rack that holds the carrier.

The rack has a first lateral rail, a second lateral rail and a backplane with a connector. The connector of the rack couples with the connector of the carrier. The term "rack" is broadly understood to include racks that are integrated within a memory storage device housing, removable racks, and externally mounted racks. Accordingly, it can be appreciated that the rack can assume any of a number of configurations.

The carrier typically encloses a hard disk drive. The first lateral side of the carrier has a periphery defining an opening for allowing air to flow out from the carrier. The first and second lateral sides of the carrier are configured to slidably engage the first and second lateral rails of the rack, respectively, to insert the carrier into the rack. A fan mounts on the first lateral rail of the rack to blow air out of the carrier, through the opening of the carrier.

Preferably, the rack forms a conduit to guide air from the carrier. When the rack forms an air conduit, the fan more efficiently draws air from the carrier. Air drawn from the carrier may be expelled distally, via the backplane of the rack, or laterally, thru the lateral rails of the rack.

According to one aspect of the invention, the first lateral rail includes a seal that surrounds the fan or at least a portion of the fan. When the carrier inserts into the rack, the seal seals against the lateral side of the carrier, adjacent the opening to optimize airflow through the opening. The seal can be a rigid seal, or a compliant seal. Preferably, the lateral rails of the rack and the lateral sides of the carrier fit tightly to form a seal.

According to an alternate embodiment of the invention, the carrier includes a fan mounted on the face. The face-mounted fan cooperates with the rack fan to improve airflow through the opening.

DETAILED DESCRIPTION OF THE INVENTION

Figure 1:
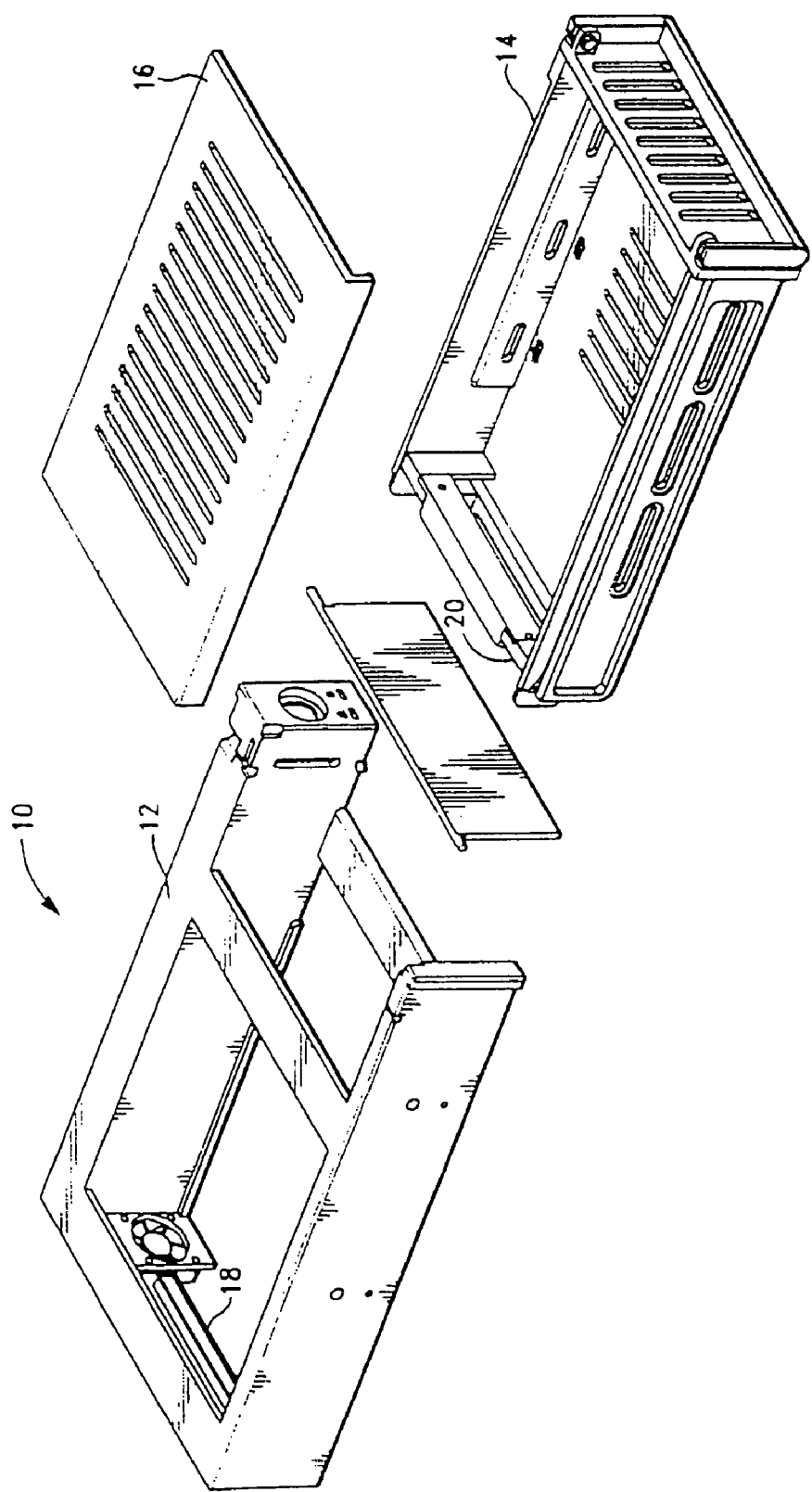
FIG. 1 shows a known docking adapter.
Figure 2:
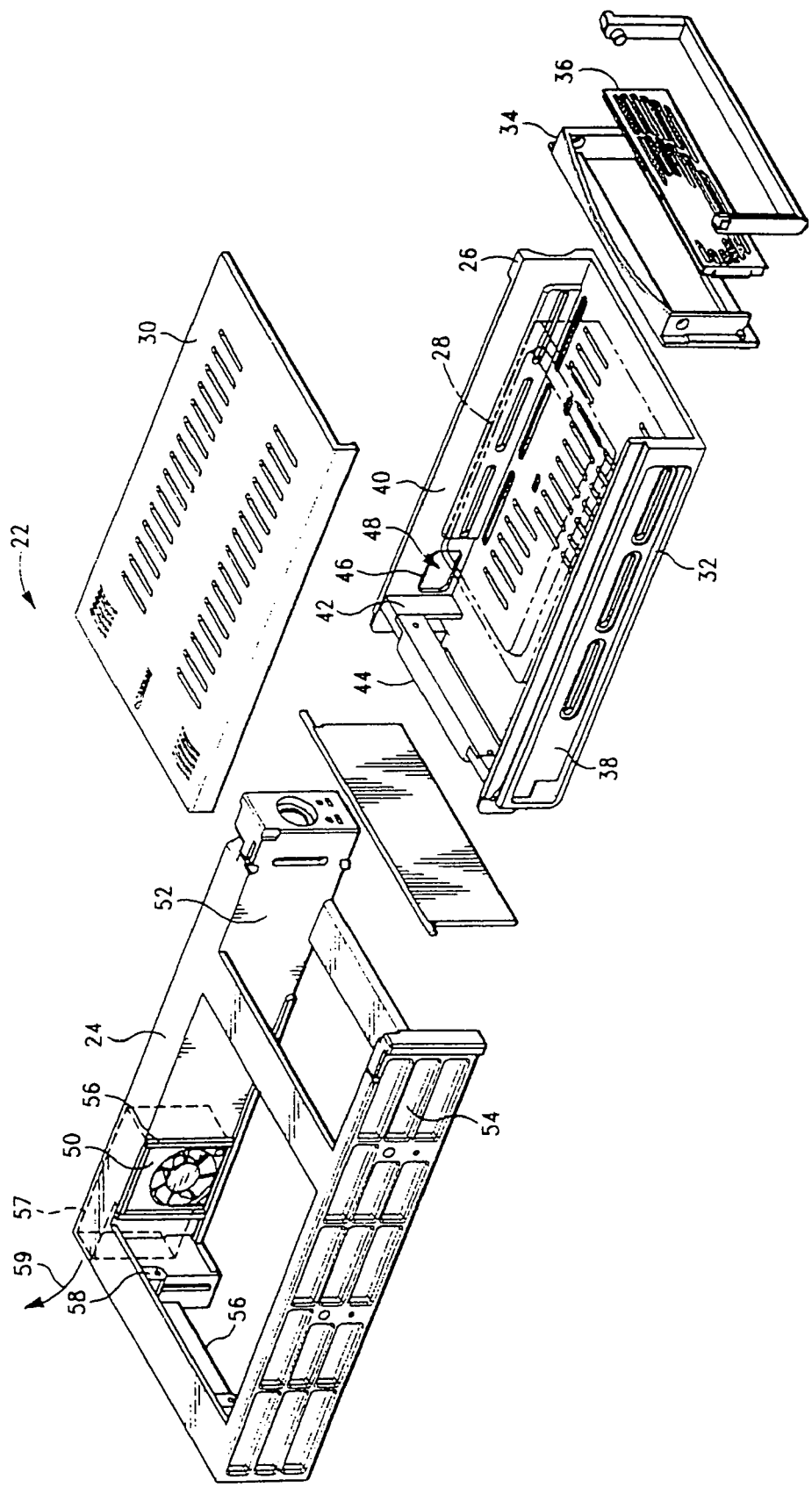
FIG. 2 shows an exploded perspective view of a docking adapter in accordance with the present invention.

FIG. 2 shows a docking adapter for memory storage devices, generally designated with the reference numeral 22. The docking adapter 22 includes a rack 24 and a carrier 26. The carrier 26 holds a hard disk drive 28. Typically, the rack 24 mounts in the bay of a microcomputer, or of a memory storage device housing. It can be appreciated, however, that the present invention can be employed in conjunction with an externally mounted hard drive. Additionally, while the docking adapter 22 is shown removeably docking the hard disk drive 28, the present invention is not limited to use with only hard disk drives. Optical drives and other heat-generating media can be removeably docked in accordance with the present invention.

The carrier 26 shrouds the hard disk drive 28 to protect the hard disk drive 28 and related components from impact during handling and transport. The carrier 26 has a top cover 30, a tray 32, a face 34 and a vent 36. The carrier 26 includes a first lateral side 38 and a second lateral side 40 that extend perpendicularly from the face, defining portions of the tray 32. The carrier 26 includes a backplane 42 with a data connector 44. The lateral side 40 of the carrier 26 has a periphery 46. The periphery defines an opening 48. The periphery 46 is generally rectangular in shape to enable air to exit the tray 32 of the carrier 26 to cool the hard disk drive 28.

The rack 24 has a fan 50, a first lateral rail 52, a second lateral rail 54 and a backplane 56 with a data connector 58. The data connector 58 couples with the data connector 44 and the opening 48 aligns with the fan 50 when the carrier 26 inserts into the rack 24. Preferably, the lateral sides 38 and 40 of the carrier 26 slidably engage the lateral rails 54 and 52 of the rack 24, respectively, to enable the carrier 26 to slide into the rack 24.

Although a single fan 50 mounted on the first lateral rail 52 is shown, it can be appreciated that additional fans can mount on the rack 24. For example, a fan 50 can mount on the second lateral rail 54 in accordance with the invention to improve cooling of the hard disk drive 28. It can also be appreciated that the carrier may have additional openings to accommodate any additional rack-mounted fans.

The first lateral rail 52 includes a seal 56. The fan 50 has a square periphery with four sides. The seal 56 surrounds the four sides of fan 50, sealing the first lateral rail 52 against the lateral side 40 of the carrier 26 when the carrier 26 inserts into the rack 24. The seal 56 is positioned adjacent the opening 48 to optimize airflow through the opening 48 when the carrier 26 inserts into the rack 24. It can be appreciated that although the seal 56 fully surrounds the fan 50, the seal 56 may alternatively surround only a portion of the fan 50. The seal 56 shape and configuration depend on the configuration of the carrier 26, the top cover 30, the backplane 58 and rail 52 of the rack 24.

It can be appreciated that the seal 56 may be rigid or compliant. According to one aspect of the invention, the seal 56 is compliant, being fabricated from rubber. It can also be appreciated that the seal may attach to the carrier 26 periphery 46, instead of attachment to the rack 24. According to one aspect of the invention, the carrier side 40 and the rack rail 52 fit tightly to seal the fan 50 against the carrier side 40.

The lateral rail 52 is box-shaped to form a conduit 57 through the lateral rail 52. The conduit enables the lateral rail 52 to direct air from the carrier 26 through the distal end of the rack 24, out past the rack backplane 58 in the direction of the arrow 59.

Preferably, the opening 46 is at least ¼ square inches in area to enable the airflow to be sufficient to cool the hard disk drive 28. More preferably, the opening 46 is between ¼ and 1 square inches in area to effectuate hard drive cooling.

Figure 3:
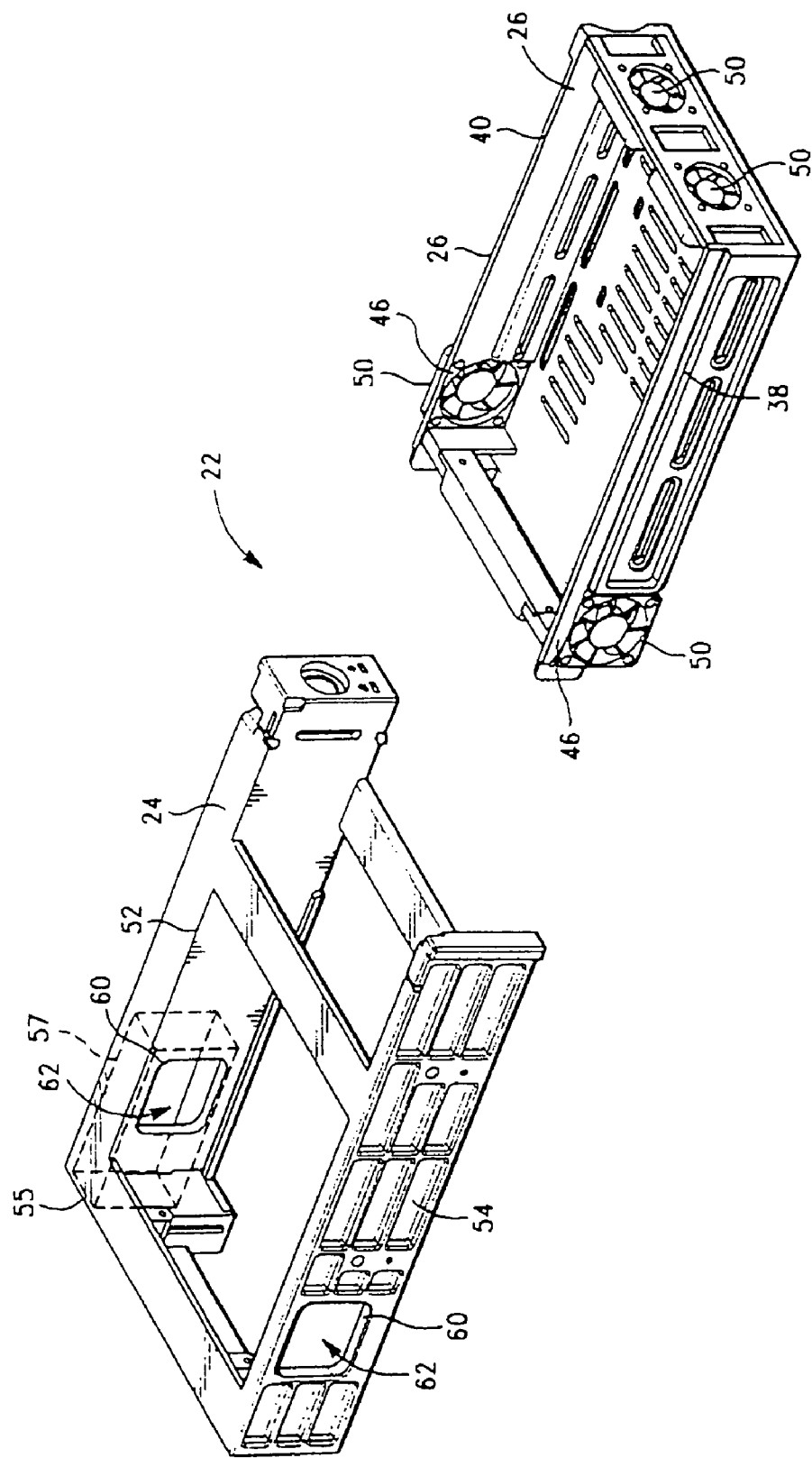
FIG. 3 shows an exploded perspective view of a docking adapter in accordance with the present invention.

FIG. 3 shows the docking adapter 22 where the carrier 26 includes fans 50 mounted on the periphery 46 of the first lateral side 38 and the second lateral side 40 of the carrier 26. The rack 24 has a distal end 55.

The first rail 52 and the second rail 54 of the rack 24 each have a periphery 60 defining an opening 62. When the carrier 26 inserts into the rack 24, the carrier fans 50 of each lateral side 38 and 40 align, respectively, with the rack opening 62 to blow air from the carrier 26 through the rack opening 62. The rack opening 62 on the lateral rail 52 enables air to blow through the conduit 57, exiting exit from the distal end 55 of the rack 24. Preferably, each rack opening 62 is at least ¼ square inches in area to enable sufficient airflow to cool a carrier-mounted memory storage device. More preferably, each opening 62 is between ¼ and 1 square inches in area.

According to an alternate aspect of the invention, the carrier 26 has a single fan 50 mounted only to one lateral side 38 of the carrier 26.

Figure 4:
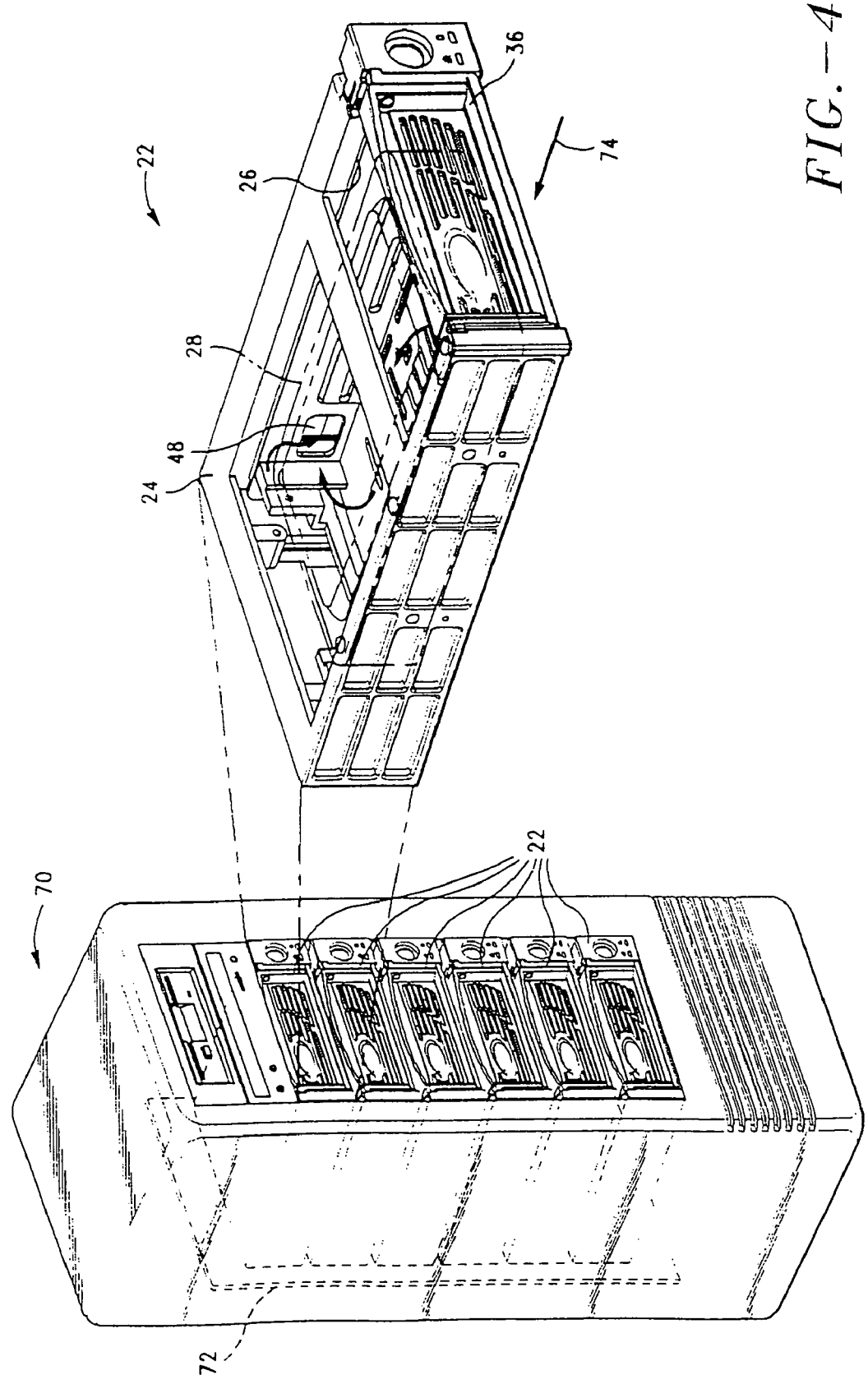
FIG. 4 shows a perspective view of docking adapters stacked in a memory storage device housing.

FIG. 4 shows a memory storage device housing, generally designated with the reference numeral 70. Multiple docking adapters 22 closely stack in the memory storage housing. The memory storage housing 70 includes a connector board 72 that electronically couples with each docking adapter 22.

The fan 50 (hidden by the carrier 26) draws air through the vent 36 in the direction of the arrows 74 to introduce cool air into the docking adapter 22. The air passes over and cools the hard disk drive 28. The fan 50 blows the air out from the carrier 26, through the opening 48.

The use of a laterally mounted fan 50 in a docking adapter 22 can be adapted to direct air laterally outward from the rack 24 instead of distally directing air. This would be useful in memory storage housings having a connector board which may interfere with distally directed airflow. It can be appreciated that additional fans 50 may be affixed to the rack 24, or the carrier 26. Also, the rack 24 may include a cover 30 with vents (FIG. 2), or without vents, so that the cover of the rack forms a conduit between the hard disk drive 28 and the cover 30.

Figure 5:
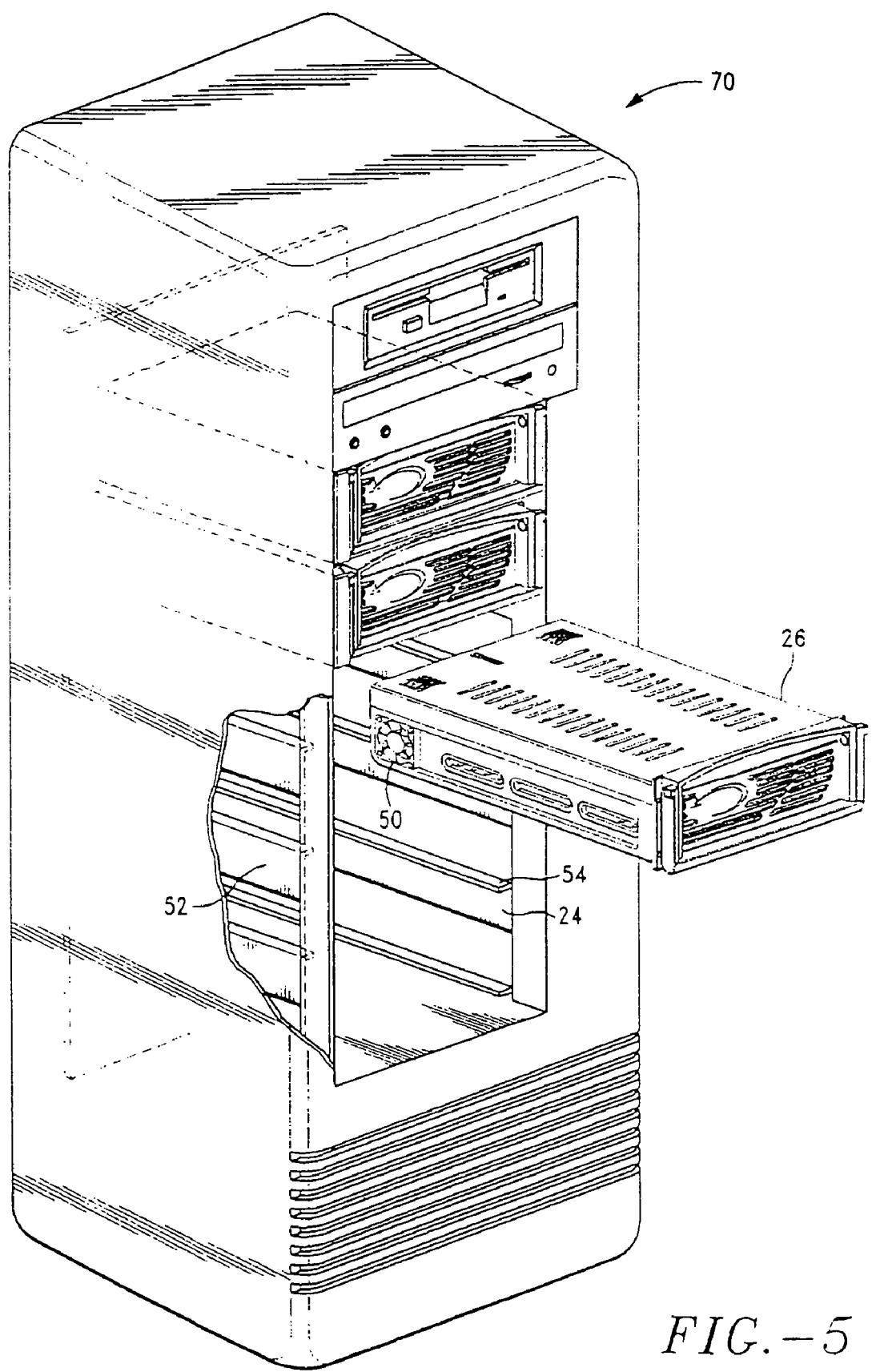
FIG. 5 shows a perspective view of a rack holding multiple carriers.

FIG. 5 shows a perspective view of a memory storage housing 70 having integrated racks 24. The integrated racks 24 include lateral rails 52 and 54 for sliding the carrier 26 into the memory storage housing 70. As shown, the carrier 26 has a laterally mounted fan 50. It can be appreciated, however, that the fan 50 may also be fixed on one or both of the lateral rails 52 and 54 to facilitate cooling.

The above description is illustrative only and is not limiting. The present invention is limited only by the claims which follow.

What is claimed is:

1. A rack configured to support a carrier, the rack comprising:
   a backplane, a first lateral rail and a second lateral rail extending from the backplane;
   an opening in the first lateral rail; and
   a first cooling device mounted on the first lateral rail and configured to blow air through the opening.

2. The rack of claim 1, wherein the backplane comprises at least one data connector.

3. The rack of claim 1, wherein the first cooling device covers the opening.

4. The rack of claim 1, further comprising a second cooling device supported by the second lateral rail.

5. The rack of claim 1, wherein the first lateral rail defines a conduit for delivering air from the carrier.

6. The rack of claim 1, wherein the carrier is configured to carry a memory device.

7. A docking adapter, comprising:
- a rack configured to support at least one carrier, the rack comprising a first lateral rail and a second lateral rail;
- a carrier configured to support at least one memory device, the carrier comprising a first lateral side and a second lateral side; and
- at least one cooling device mounted on the first lateral rail of the rack or the first lateral side of the carrier.

8. The docking adapter of claim 7, wherein the cooling device is supported by an opening on the first lateral side of the carrier.

9. The docking adapter of claim 7, further comprising at least one additional cooling device mounted on the second lateral rail of the rack or the second lateral side of the carrier.

10. The docking adapter of claim 7, wherein the carrier is configured to be slidably engaged with the rack.

11. The docking adapter of claim 7, wherein the first lateral side and the second lateral side of the carrier extend from a backplane comprising at least one data connector.

12. The docking adapter of claim 7, wherein the carrier has a face with a vent, and the first lateral side and the second lateral side of the carrier extend perpendicularly from the face.

13. The docking adapter of claim 12, wherein at least one additional cooling device is mounted on the face.

14. A method for removably interconnecting a memory storage device to a computer system comprising:
- inserting a carrier configured to support at least one memory device into a rack, the carrier comprising a first lateral side and a second lateral side, and the rack comprising a first lateral rail and a second lateral rail; and
- passing air through the carrier from a first cooling device mounted on the first lateral side of the carrier or the first lateral rail of the rack.

15. The method of claim 14, further comprising passing air generated from the first cooling device through an opening on the first lateral side of the carrier.

16. The method of claim 14, further comprising slidably engaging the carrier with the rack.

17. The method of claim 14, further comprising connecting the carrier to the computer system by at least one data connector on a backplane of the carrier.

18. The method of claim 14, further comprising passing air through the carrier by at least one vent on a face of the carrier, wherein the first lateral side and the second lateral side of the carrier extend perpendicularly from the face.

19. The method of claim 14 further comprising a second cooling device mounted on the second lateral side of the carrier.

20. A method for removably interconnecting a memory storage device to a computer system comprising:
- inserting a carrier configured to support at least one memory device into a rack, the carrier comprising a first lateral side and a second lateral side, and the rack comprising a first lateral rail and a second lateral rail;
- passing air through the carrier from at least one cooling device associated with the first lateral side of the carrier or the first lateral rail of the rack; and
- passing air from at least one additional cooling device mounted on the second lateral side of the carrier or the second lateral rail of the rack.

* * * * *